(12) United States Patent
Coers et al.

(10) Patent No.: US 9,622,409 B2
(45) Date of Patent: Apr. 18, 2017

(54) RECIPROCATING KNIFE ASSEMBLY AND RECIPROCATING KNIFE DRIVE ASSEMBLY

(75) Inventors: Bruce Alan Coers, Hillsdale, IL (US); Daniel James Burke, Cordova, IL (US); Ryan Patrick Mackin, Milan, IL (US); James Kelley Adamson, Colona, IL (US); Mark L. Pearson, LeClaire, IA (US)

(73) Assignee: Deere & Company, Moline, IL (US)

( * ) Notice: Subject to any disclaimer, the term of this patent is extended or adjusted under 35 U.S.C. 154(b) by 857 days.

(21) Appl. No.: 12/608,557

(22) Filed: Oct. 29, 2009

(65) Prior Publication Data

US 2011/0099964 A1 May 5, 2011

(51) Int. Cl.
*A01D 34/13* (2006.01)
*A01D 41/14* (2006.01)
*A01D 34/30* (2006.01)

(52) U.S. Cl.
CPC ............. *A01D 41/14* (2013.01); *A01D 34/30* (2013.01)

(58) Field of Classification Search
CPC ................................ A01D 41/14; A01D 34/30
USPC ........ 56/13.6, 158, 123, 232, 236, 242, 243, 56/257–287, 297, 299, 316
See application file for complete search history.

(56) References Cited

U.S. PATENT DOCUMENTS

| | | | |
|---|---|---|---|
| 549,605 A | 11/1895 | Kerwin | |
| 1,351,939 A * | 9/1920 | Andre | 56/11.4 |
| 3,973,378 A * | 8/1976 | Bartasevich et al. | 56/246 |
| 4,166,351 A * | 9/1979 | Nienberg | 56/192 |
| 4,267,689 A | 5/1981 | Schneider et al. | |
| 6,510,681 B2 | 1/2003 | Yang et al. | |
| 6,889,492 B1 * | 5/2005 | Polk et al. | 56/257 |
| 6,962,040 B2 | 11/2005 | Talbot | |
| 7,401,458 B2 * | 7/2008 | Priepke | 56/296 |
| 7,478,522 B1 | 1/2009 | Lovett et al. | |
| 7,520,118 B1 * | 4/2009 | Priepke | 56/257 |
| 2007/0204586 A1 | 9/2007 | Coers | |

* cited by examiner

*Primary Examiner* — Thomas B Will
*Assistant Examiner* — Mai Nguyen

(57) ABSTRACT

A reciprocating knife assembly of an agricultural implement includes first and second elongate reciprocating knives disposed along a leading edge of an agricultural implement, the reciprocating knives being disposed end to end and extending colinearly for simultaneous reciprocation in opposite directions, the first and second reciprocating knives being supported for sliding movement on the agricultural implement in a lateral direction generally perpendicular to the direction of travel of the agricultural implement as it travels through an agricultural field harvesting crop, a first bell crank coupled to the first reciprocating knife to reciprocate said knife, a second bell crank coupled to the second reciprocating knife to reciprocate the second reciprocating knife, and a common drive coupled to the first and second bell cranks to drive both the first and second bell cranks in opposite directions simultaneously.

13 Claims, 5 Drawing Sheets

RECIPROCATING KNIFE ASSEMBLY AND RECIPROCATING KNIFE DRIVE ASSEMBLY

FIELD OF THE INVENTION

The invention relates to agricultural harvester vehicles. More particularly it relates to agricultural implements for mounting on the agricultural harvester vehicles. Even more particularly it relates to draper platforms with reciprocating knife assemblies for severing plants from the ground.

BACKGROUND OF THE INVENTION

Agricultural harvester vehicles are often employed in the field with implements such as draper platforms or windrowers to sever crop plants from the ground and alternatively gather them for further processing.

These reciprocating knives are in the general form of an elongate cutter bar including one or more elongate reciprocating members to which a plurality of triangular knife blades is fixed. The reciprocating knife blades are translated back and forth at high speed such that they pass through slots in stationary knife guards. The relative movement of the blades in the knife guards works like a row of scissors to sever the plant stalks. The severed portions of the plants typically fall backward onto a gathering mechanism such as a lateral conveyor. The lateral conveyor, disposed immediately behind the reciprocating knives, carries them to a central region of the implement from which they are further conveyed to the agricultural harvester, or are deposited on the ground.

In one common arrangement, a single reciprocating gearbox is disposed at one end of the implement and drives a single reciprocating knife that extends the entire width of the implement. An example can be seen in U.S. Pat. Nos. 4,267,689 or 6,510,681. This arrangement is satisfactory for a narrow implement, on the order of 5-8 meters wide, but is of limited value for wider implements because of the greater length and hence larger reciprocating mass. As the reciprocating mass increases, it shakes the header more and more which can cause failures.

In another arrangement, shown in U.S. Pat. No. 6,962,040 or in U.S. Pat. No. 7,478,522 a reciprocating knife is driven by gearboxes disposed on opposite ends of the implement. The knife may be a single long piece, or it may be made in two (or more) pieces and be driven 180 degrees out of phase. This arrangement requires two gearboxes, one on each end of the implement, and two elongate drive shafts extending from the middle of the implement to the two ends. Each reciprocating knife is about half the width of the implement. The two reciprocating knives are of generally the same size and reciprocate 180 degrees out of phase. As a result, the oscillations tend to cancel each other out. The arrangement requires two drive shafts and two gear boxes, one for each side of the implement.

Another arrangement, shown in US 2007/0204586 and in U.S. Pat. No. 5,497,605 drives a reciprocating knife from a central position disposed in the lateral middle of the implement. In the '605 patent, a drive shaft extending forward over the center conveyor of a draper platform, drives a crank at the front of the implement in a circular motion. This arrangement is disposed above and blocks crop flow onto the center conveyor. In addition, two rods that are coupled to the crank extend laterally outward and downward from the elevated crankshaft to two reciprocating knives to drive the knives. This reduces the weight of the reciprocating knife arrangement by providing one common drive mechanism and by avoiding the drive shafts that extend across the entire width of the implement. Unfortunately, it elevates the drive mechanism above the conveying mechanism and blocks the flow of crop from the cutter bar onto the conveying mechanism.

What is desired therefore is a drive mechanism for driving at least one reciprocating knife of an agricultural implement that does not require the addition of large gearboxes at the ends of the platform and additional (or longer) drive shafts to drive them. What is also desired is an arrangement that avoids the crop flow blocking structures disposed above the conveying mechanisms. What is also desired is a drive mechanism that takes up less space by disposing at least part of the drive mechanism within the endless belts. It is an object to provide all of these advantages in one or more of the independent and dependent claims provided below.

SUMMARY OF THE INVENTION

More than one invention is described herein as summarized below in the various aspects of the invention.

In accordance with a first aspect of the invention, a reciprocating knife assembly of an agricultural implement having a laterally extending mainframe is provided that comprises a first elongate reciprocating knife disposed along a leading edge of the agricultural implement on the left hand side of the implement, a second elongate reciprocating knife disposed along a leading edge of the agricultural implement on the right side of the implement; said first and second reciprocating knives are disposed end to end and extend colinearly for simultaneous reciprocation in opposite directions, said first and second reciprocating knives are supported for sliding movement on the agricultural implement in a lateral direction generally perpendicular to the direction of travel of the agricultural implement as it travels through an agricultural field harvesting crop; and a reciprocating knife drive assembly, said reciprocating knife drive assembly comprising a first bell crank coupled to the first reciprocating knife to reciprocate said knife in the lateral direction; and a second bell crank coupled to the second reciprocating knife to reciprocate the second reciprocating knife.

Each of the first and second bell cranks may be disposed within a loop of an endless belt of a left side or right side conveyor of a draper platform. The first and second bell cranks may be disposed within the same loop of the endless belt of the left side or right side conveyor. The reciprocating knife drive assembly may further comprise at least one driving member that drives the first and second bell cranks. The at least one driving member may be disposed at least partially within a loop of an endless belt of a left side or right side conveyor of a draper platform. The reciprocating knife drive assembly may further comprise first and second flexible couplings that couple the first and second bell cranks to the first and second reciprocating knives and the flexible couplings may be ball couplings. The reciprocating knife drive assembly may further comprise a gearbox disposed directly behind the first and second bell cranks on the agricultural implement to drive both of the bell cranks in reciprocating motion. The first and second bell cranks may be supported on at least one arm that extends generally forwardly from the mainframe and is pivotally coupled at its rear end to the mainframe to pivot up and down about a horizontal and laterally extending axis, and at its front end is fixed to the cutter bar.

In accordance with a second aspect of the invention, a reciprocating knife drive assembly of an agricultural implement is provided, the implement having a laterally extending mainframe and a reciprocating knife assembly comprising a first elongate reciprocating knife disposed along a leading edge of the agricultural implement on the left hand side of the implement, a second elongate reciprocating knife disposed along a leading edge of the agricultural implement on the right side of the implement; said first and second reciprocating knives are disposed end to end and extend colinearly for simultaneous reciprocation in opposite directions, wherein the first and second reciprocating knives are supported for sliding movement on the agricultural implement in a lateral direction generally perpendicular to the direction of travel of the agricultural implement as it travels through an agricultural field harvesting crop; wherein the reciprocating knife drive assembly comprises a first bell crank configured to be coupled to the first reciprocating knife to reciprocate the first reciprocating knife in the lateral direction on the agricultural implement; a second bell crank configured to be coupled to the second reciprocating knife to reciprocate the second reciprocating knife in the lateral direction on the agricultural implement; and a common frame supporting both the first and the second bell cranks for pivoting.

Each of the first and second bell cranks and the common frame maybe disposed within a loop of an endless belt of a side conveyor of a draper platform. The first and second bell cranks may be disposed within the same loop of the endless belt of the side conveyor. The reciprocating knife drive assembly may further comprise at least one elongate fore-and-aft extending driving member that drives both the first bell crank and the second bell crank. The at least one driving member may be disposed at least partially within a loop of an endless belt of a side conveyor of a draper platform. The reciprocating knife drive assembly may further comprise first and second flexible couplings that couple the first and second bell cranks to the first and second reciprocating knifes, respectively. The flexible couplings maybe ball couplings. The reciprocating knife drive assembly may further comprise a gearbox disposed directly behind the first and second bell cranks on the agricultural implement to drive both of the bell cranks in reciprocating motion. The frame may have a front end and a rear end and may be pivotally coupled at its rear end to the mainframe to pivot up and down about a horizontal and laterally extending axis, and maybe fixed at its front end to the cutter bar.

In accordance with a third aspect of the invention, a bell crank for reciprocating a reciprocating knife of an agricultural implement is disposed inside an endless belt loop of the agricultural implement. This implement is preferably a draper platform, and the endless loop is preferably an endless loop of a side conveyor. The bell crank is preferably driven by drive member that extends outside the belt loop and to the rear of the belt loop. The reciprocating knife is preferably disposed along a leading edge of the endless loop.

DESCRIPTION OF THE PREFERRED EMBODIMENTS

Figure 1:
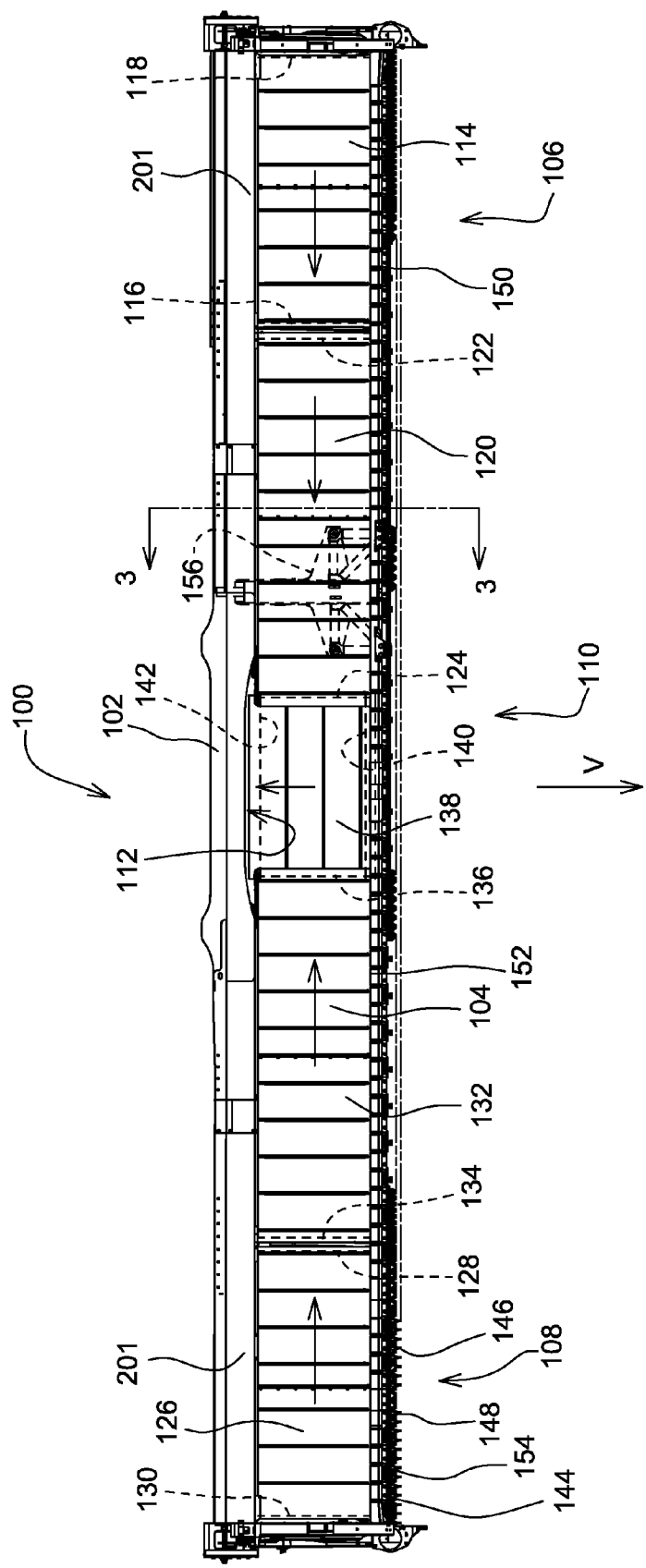
FIG. 1 is a plan view of an agricultural implement in accordance with the present invention.

In FIG. 1, an agricultural implement 100, here shown as a draper platform, has a mainframe 102 on which a conveyor system 104 is supported. Mainframe 102 extends laterally across substantially the entire width of the agricultural implement 100 and supports for relative pivotal movement the rear ends of a plurality of spaced apart forwardly extending arms, which in turn support the conveyors mounted on the agricultural implement 100 and the reciprocating knife assembly at their forward ends.

Conveyor system 104 includes a the left side conveyor 106, a right side conveyor 108, and a center conveyor 110 that are configured to convey crop plants severed from the ground to an aperture 112 disposed in the middle rear portion of frame 102. An agricultural harvester (not shown) supports the agricultural implement 100 on a feederhouse (not shown) and receives the crop delivered by the agricultural implement 100.

The left side conveyor 106 has an endless belt arrangement that extends from the far left end of the implement to the center conveyor 110. The endless belt arrangement includes an outer conveyor belt 114 which is supported on an inner conveyor roll 116 and outer conveyor roll 118, and an inner conveyor belt 120 that is supported for rotation on an outer conveyor roll 122 and an inner conveyor roll 124.

The right side conveyor 108 has an endless belt arrangement that extends from the far right end of the implement to the center conveyor 110. The endless belt arrangement includes an outer conveyor belt 126 which is supported on an inner conveyor roll 128 and an outer conveyor roll 130, and an inner conveyor belt 132 that is supported for rotation on an outer conveyor roll 134 and an inner conveyor roll 136.

The endless belts of the left side conveyor and the right side conveyor are driven in the direction indicated by the arrows superimposed on the endless belts.

The center conveyor has an endless belt arrangement including a conveyor belt 138 which is supported on a forward conveyor roll 140 and a rear conveyor roll 142.

All of the conveyor belts of the conveyors are endless, such that the top surface of the conveyor belts travels in the directions indicated by the arrows, and the belts recirculate around the conveyor rolls that support them.

The conveyor rolls have an outer diameter of between 3 cm and 10 cm, and thus define a gap of approximately 2-5 inches thick between an upper run and a lower (return) run of the endless belts.

A reciprocating knife 144 extends substantially the entire width of the agricultural implement 100 and is disposed along the leading edge of the agricultural implement to sever the crop across substantially the entire width of the agricultural implement.

The reciprocating knife 144 includes a plurality of stationary guards 146 (see also FIG. 4) that are spaced apart and are fixed to a stationary knife support 148 (FIG. 3) that extends across substantially the entire width of the agricultural implement 100.

The reciprocating knife 144 also includes a pair of elongate sliding members 150, 152, supported in the stationary guards 146, supported on stationary knife support 148, that are disposed end-to-end and reciprocate back-and-forth in a lateral direction that is perpendicular to the direction of travel "V" of the agricultural implement 100 as it harvests crop. Considered together, members 150, 152 extend across substantially the entire width of the agricultural implement 100 and are supported for sliding lateral movement on the stationary knife support 148.

The reciprocating knife 144 also includes a plurality of blades 154 that are fixed to the elongate sliding members 150, 152 and extend forward therefrom to engage stationary guards 146 and cut the stalks of the crop therebetween.

The inner ends of elongate sliding members 150, 152, which are adjacent to each other, terminate immediately adjacent to reciprocating knife drive assembly 156 and are coupled thereto to be driven thereby. Reciprocating knife drive assembly 156 is fixed to the inner ends of elongate sliding members 150, 152, and drives these members in transverse reciprocation (parallel to the longitudinal extent of members 150, 152) approximately 180° out of phase.

Figure 2:
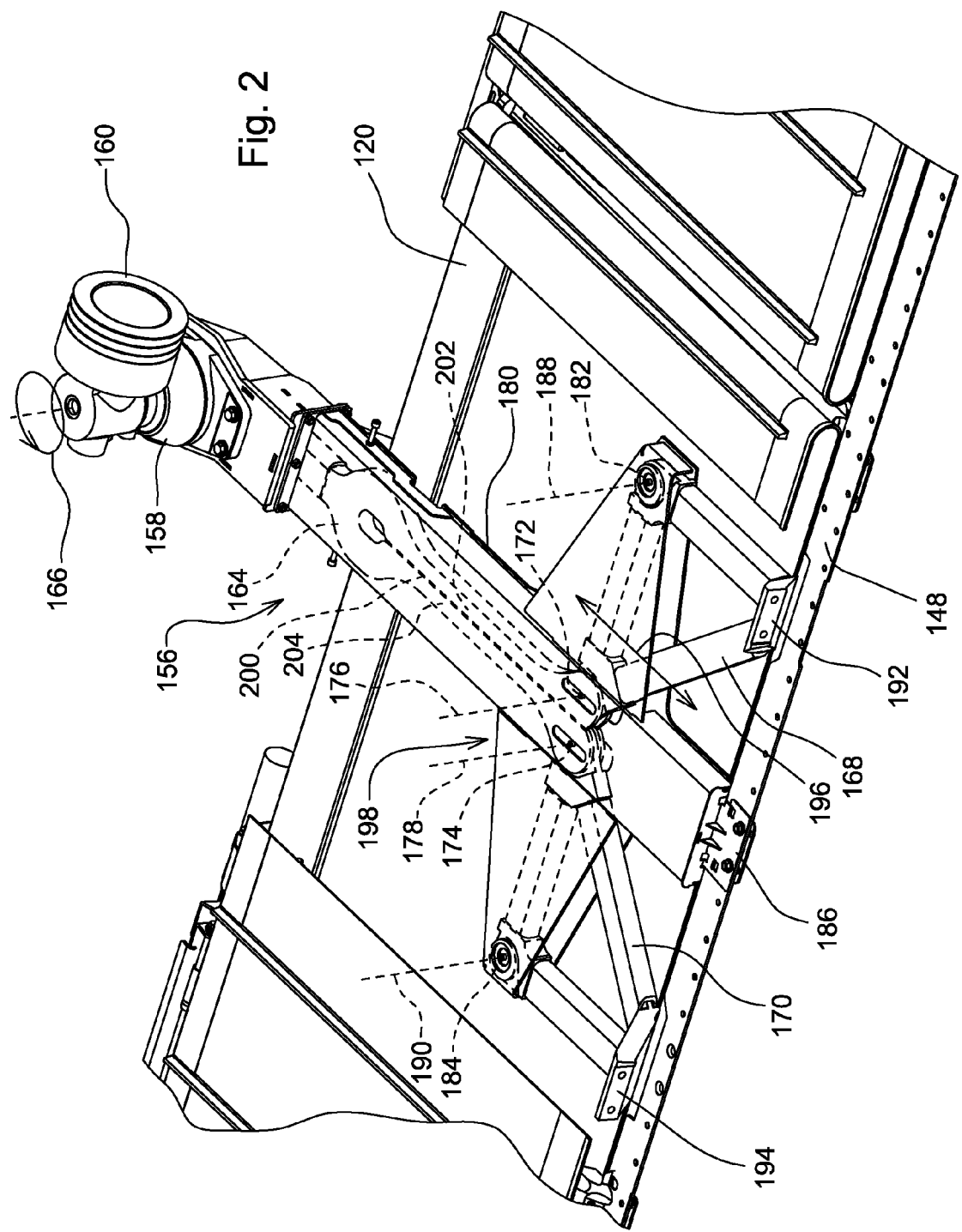
FIG. 2 is a fractional detail perspective view of the agricultural implement of FIG. 1 showing a reciprocating knife drive mechanism.

In FIG. 2, a detailed view of portions of the reciprocating knife drive assembly 156 is shown with portions of the agricultural implement 100 removed for ease of illustration. Reciprocating knife drive assembly 156 includes a gearbox 158 having a drive input 160 here shown as a pulley, and an output shaft 162 (FIG. 3) disposed underneath the gearbox 158. The output shaft 162 is coupled to an elongate drive member 164 that is coupled at its rear end to (and is driven by) output shaft 162 in a circular movement about an axis perpendicular to the upper run of belt 120. The circular movement is indicated by the circle 166.

The forward end of the elongate drive member 164 is pivotally coupled to two bell cranks 168, 170 by two pivot pins 172, 174. Pivot pins 172, 174 constrain the bell cranks to pivot with respect to elongate drive member 164 about pivotal axes 176, 178, respectively. Pivotal axes 176, 178 extend in a direction perpendicular to the upper surface of endless belt 120 and are spaced apart from each other in a direction parallel to the direction of crop travel on endless belt 120.

Bell cranks 168, 170 are supported for pivotal movement with respect to a knife drive frame 180 on pivot pins 182, 184, respectively. Knife drive frame 180 extends forward to a front end 186 that is fixed to stationary knife support 148. In FIG. 2, the elongate sliding members 150, 152, blades 154, and stationary guards 146 have been removed for clarity of illustration. The rear end of knife drive frame 180 extends rearward and is coupled to gearbox 158.

Pivot pins 182, 184 couple bell cranks 168, 170 to knife drive frame 180, and constrain bell cranks 168, 170 to pivot with respect to knife drive frame 180 about axes 188, 190, respectively. Axes 188, 190 extend in a direction perpendicular to the upper surface of endless belt 120.

The bell cranks, pivot pins, elongate drive member, and frame of the reciprocating knife drive assembly 156 are disposed between the upper and lower portions (the upper and lower runs) of endless belt 120. The knife drive frame 180 that supports these elements extends completely through endless belt 120. The rear end of knife drive frame 180 extends rearward and outside of the space between the upper and lower portions of endless belt 120. Gearbox 158, which is fixed to the rear end of knife drive frame 180, is disposed outside and behind endless belt 120.

Pivotal axes 190, 178, 176, 188 are generally parallel to one another and extend generally in a line that is parallel to the direction of travel of endless belt 120. While axes 176, 178 can pivot about axes 188, 190, in their midpoint-of-travel position (shown in FIG. 2) they are disposed in this line, Bell crank 168 has a generally right triangular shape in which the triangle's sides extend between pivotal axes 188, 176 and a coupling mount 192, with pivotal axis 188 disposed at the apex of the right angle. Coupling mount 192 is configured to receive and support a flexible coupling that connects bell crank 168 to elongate sliding member 150. Coupling mount 192 is disposed in front of pivot pin 182. More particularly, coupling mount 192 is disposed with respect to pivot pin 182 in a direction that is perpendicular to the direction of travel of endless belt 120 and generally parallel to the upper surface of endless belt 120.

Bell crank 170 has a generally right triangular shape in which the triangle's sides extend between pivotal axes 190, 178 and a coupling mount 194, with pivotal axis 190 disposed at the apex of the right angle. Coupling mount 194 is configured to receive and support a flexible coupling that connects bell crank 170 to elongate sliding member 152. Coupling mount 194 is disposed in front of pivot pin 184. More particularly, coupling mount 194 is disposed with respect to pivot pin 184 in a direction that is perpendicular to the direction of travel of endless belt 120 and generally parallel to the upper surface of endless belt 120.

Bell cranks 168, 170 constrain the forward end of elongate drive member 164 to reciprocate in a direction that is perpendicular to the direction of travel of endless belt 120. This direction is generally parallel to the direction of travel "V" (FIG. 1) of the agricultural implement 100, but is tilted slightly forward and downward since the endless belt 120 (in this instance) is tilted forward such that it is disposed lower at its forward edge than at its rear edge. This direction of reciprocation of elongate drive member 164 is indicated by double headed arrow 196 in FIG. 2.

Since the elongate drive member 164 is pinned to the bell cranks, the front end 198 of the elongate drive member 164 does not follow perfectly straight paths, but slightly arcuate paths having center points defined by pivotal axes 188, 190.

The elongate drive member 164 is split, having a slot 200 that extends from the front end 198 rearward and generally parallel to the longitudinal extent of elongate drive member 164. Slot 200 divides the shank of elongate drive member 164 into a left elongate member 202 and a right elongate member 204 that are generally equal in cross section and length, and preferably are mirror images of one another. These elongate members 202, 204 are configured to flex slightly apart in an elastic manner to follow the slightly arcuate paths of pivot pins 172, 174 as elongate drive member 164 is reciprocated by gearbox 158. This flexure is beneficial because it permits elongate drive member 164 to be formed as a single member.

Figure 3:
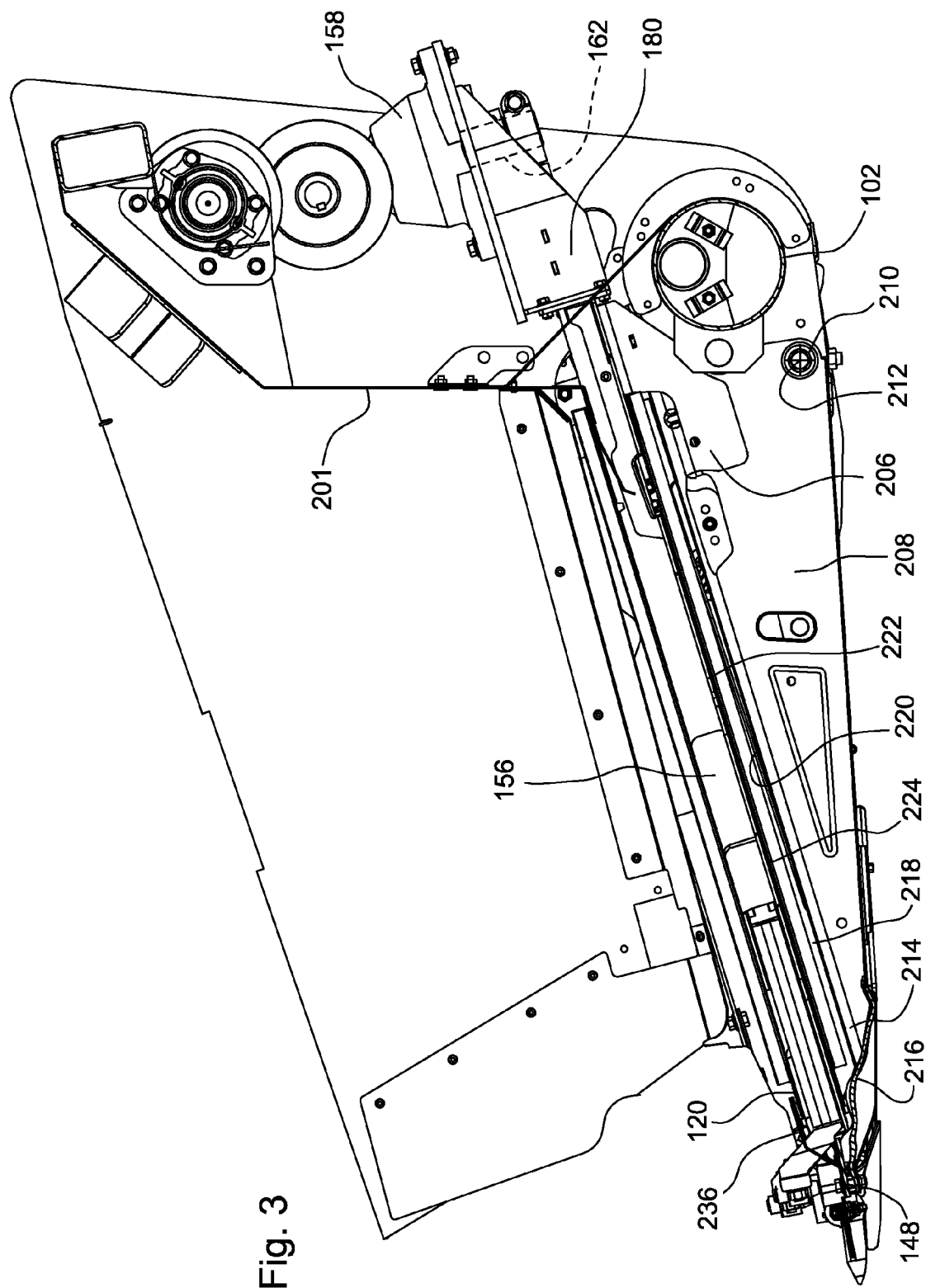
FIG. 3 is a cross-sectional view of the agricultural implement of FIGS. 1-2 taken section line 3-3 in FIG. 1.

Referring now to FIG. 3, gearbox 158 is mounted on the rear end of knife drive frame 180 to move together with knife drive frame 180. Gearbox 158 is disposed immediately behind back sheet 201.

Back sheet 201 provides a rear wall that is generally vertical and that extends substantially the entire length of conveyors 114, 116 (FIG. 1). Back sheet 201 prevents crop from being carried completely across conveyors 114, 116 and being deposited on the ground behind agricultural implement 100.

The rear end of knife drive frame 180 is fixed to forwardly extending conveyor support arm 208 by side braces 206 which are bolted to conveyor support arm 208. The rear of conveyor support arm 208 is pivotally coupled to frame 102 by a pivot pin 210. Pivot pin 210 constrains conveyor support arm 208 such that the conveyor support arm 208 and the reciprocating knife drive assembly 156 both pivot about a laterally extending axis 212. Axis 212 extends generally parallel to the direction of travel of endless belt 120 and perpendicular to the direction of travel "V". The forward end 214 of conveyor support arm 208 is fixed to a skid shoe 216, which in turn is coupled to stationary knife support 148, and is therefore indirectly fixed to stationary knife support 148. The forward end 214 of conveyor support arm 208 can be extended such that it is fixed directly to stationary knife support 148, and skid shoe 216 can be fixed to stationary knife support 148 as well.

As the agricultural implement 100 travels over the ground, the ground presses upward against skid shoe 216, and causes conveyor support arm 208 to pivot up and down about axis 212 with respect to frame 102 as skid shoe 216 follows the terrain over which agricultural implement 100 is traveling. At the same time, since reciprocating knife drive 156 is fixed to conveyor support arm 208, it also pivots up and down about axis 212 in synchrony with conveyor support arm 208.

Conveyor support arm 208 and frame 180 define an elongate space 218 that is formed between the upper surface 220 of conveyor support arm 208 and the lower surface 222 of frame 180. This elongate space 218 is sufficient in length and height to receive the lower section or lower run 224 of endless belt 120 and permit it to follow its return path from inner conveyor roll 124 to outer conveyor roll 122 unimpeded.

Figure 4:
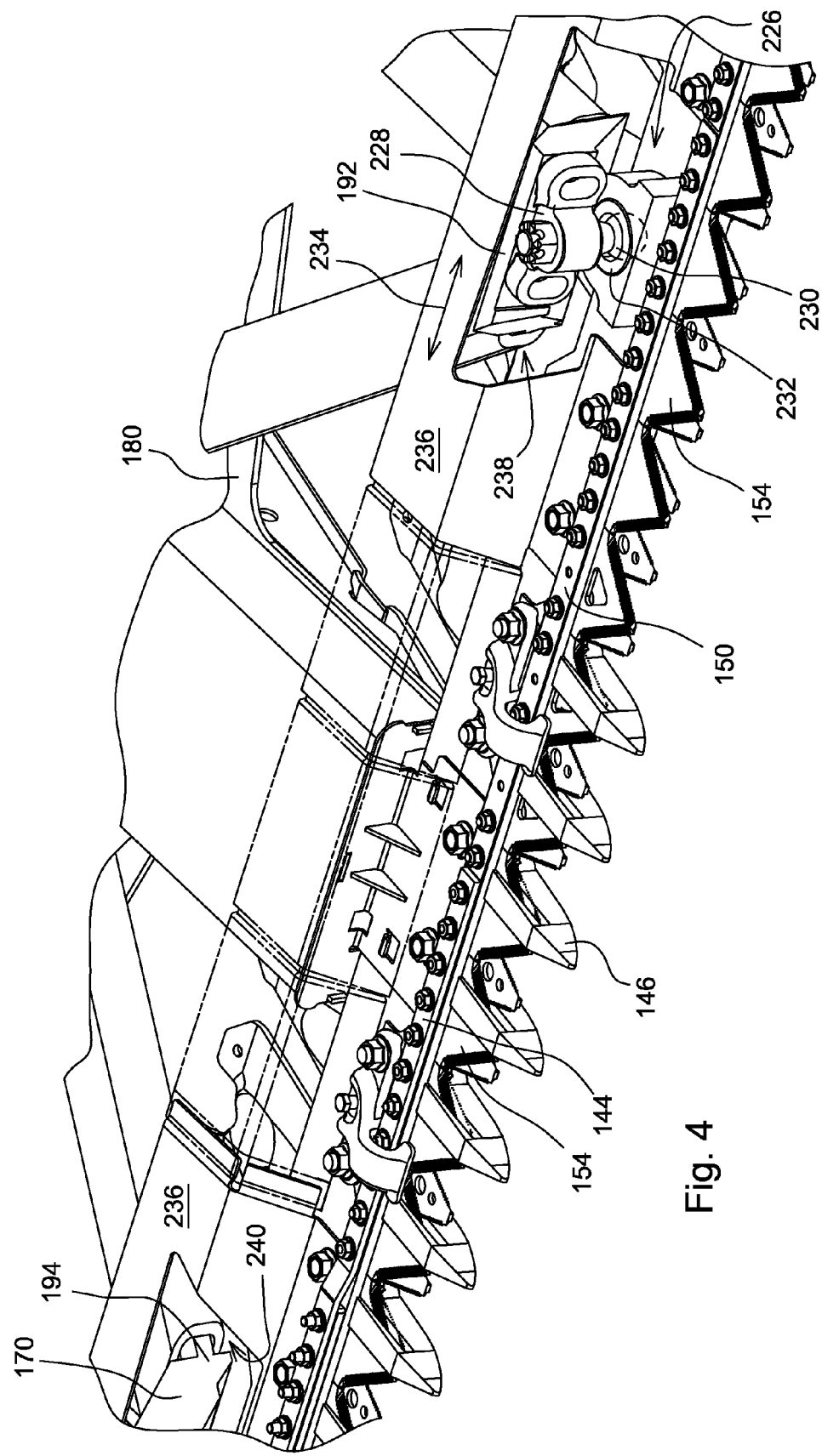
FIG. 4 is a fractional detail view of the agricultural implement of FIGS. 1-3 with the conveyor belt removed and showing the attachment of the reciprocating knife drive mechanism to the cutterbar in the reciprocating knife disposed thereon.

In FIG. 4, coupling mount 192 is shown with flexible coupling 226 attached thereto. Flexible coupling 226 includes a ball mount 228 attached to coupling mount 192. A ball member 230 is disposed inside a resilient material 232 having a ball receiving aperture that in turn is coupled to elongate sliding member 150.

Coupling mount 192 translates generally from side to side in a direction indicated by the double headed arrow 234. The path that it describes is not a perfectly straight line, but describes a very shallow arc, since the movement of coupling mount 192 describes an arc of movement about pivotal axis 188 as the left ball crank 168 is driven by elongate member 164 in reciprocating movement about pivot pin 182. Flexible coupling 226 permits these forces to be communicated from ball 230 which follows a straight, albeit slightly curved or arcuate path 234 to elongate sliding member 150 which follows a straight path. Flexible coupling 226 also permits conveyor support arm 208 to pivot up and down about axis 212 without forcing elongate sliding members 150, 152 to similarly pivot. A second flexible coupling (not shown) that is identically constructed is fixed to coupling mount 194 and to elongate sliding member 152. Bell crank 168 therefore drives elongate sliding member 150 and bell crank 170 therefore drives elongate sliding member 152.

An apron 236 is disposed directly behind the reciprocating knife and provides a smooth surface over which the cut crop material can be carried. Cut crop material which is pushed backwards by a conventional reel (not shown) slides upward and over apron 236 and is lifted onto the upper surface of endless belt 120. Apron 236 extends generally parallel to the leading edge of endless belt 120 and covers the leading edge over substantially the entire length of the endless belts of conveyors 114 and 116. This overlap is seen best in cross section in FIG. 3.

In order to couple bell crank 168 to elongate sliding member 150, an aperture 238 is provided in a portion of apron 236 directly forward of coupling mount 192. A similar aperture 240 is provided directly adjacent to coupling mount 194 on bell crank 170.

Figure 5:
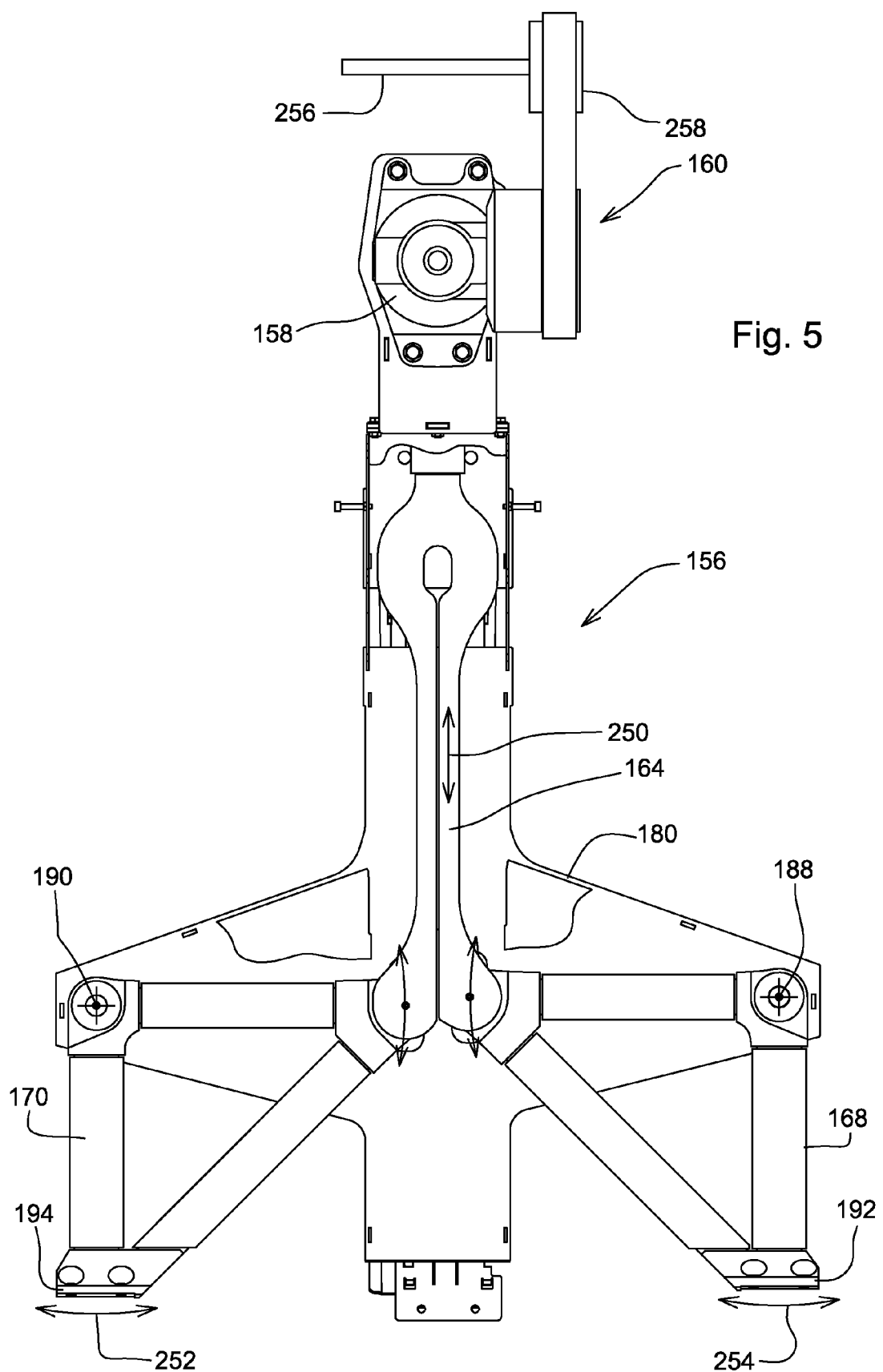
FIG. 5 is a plan view of the reciprocating knife drive assembly alone showing its range of motion.

Referring now to FIG. 5, when elongate drive member 164 reciprocates in the direction indicated by arrow 250 it causes bell cranks 168 and 170 to simultaneously pivot about pivotal axes 188, 190. When bell crank 168 rotates in a clockwise direction about pivotal axis 188, bell crank 170 simultaneously rotates in a counterclockwise direction about pivotal axis 190. As a result, coupling mount 192 and coupling mount 194 move in the same, generally lateral direction following a slightly arcuate path 252, 254. Their relative motions are 180° out of phase. This causes elongate sliding member 150 to slide toward the right hand side of agricultural implement 100 while causing elongate sliding member 152 to slide in the opposite direction i.e. toward the left-hand side of agricultural implement 100 as elongate drive member 164 is moved towards the rear of the agricultural implement 100 by gearbox 158.

Similarly, gearbox 158 drives elongate drive member 164 toward the front of the agricultural implement 100, elongate sliding member 152 sliding towards the right hand side of agricultural implement 100 as elongate sliding member 150 slides toward the left-hand side of agricultural implement 100. These sliding movements of elongate sliding members 150, 152 and the rotational movements of bell cranks 168, 170 about their respective pivot axes 188, 190 are reciprocating, approximately, sinusoidal, and are generally 180° out of phase.

Reciprocating knife drive assembly 156 is driven by a back shaft 256 which drives a pulley 258. Pulley 258, in turn, is coupled to the drive-input 160 of gearbox 158 by a plurality of belts 260. Back shaft 256 extends from the reciprocating knife drive assembly 156 to a point adjacent to the aperture 112, where it is then connected to a drive mechanism extending from the agricultural combine which drives the agricultural implement 100.

Referring back to FIG. 1, the reciprocating knife drive assembly 156 is located adjacent to aperture 112 and is driven by a drive shaft that extends only a portion of the length of one side of agricultural implement 100. In this case, approximately 2 m, or approximately ⅛ or 1/10 the overall lateral width of the agricultural implement 100. The reciprocating knife drive assembly 156 is located at the 60/40 point along the overall lateral width of the agricultural implement 100. In other words, it is not located exactly in the middle of the agricultural implement 100 directly over center conveyor 110. If it were located in the middle, elongate sliding member 152 and elongate sliding member 150 together with all of the blades attached thereto, would be equal in mass and thus the mass of the two elongate sliding members would cancel each other out when they reciprocated 180° out of phase. As shown in the prior art, however, this would put the drive mechanism right in the middle of center conveyor 110, blocking the flow of crop.

Instead, the present reciprocating knife drive assembly 156 is disposed just to one side of the center conveyor 110 at a 60%/40% location along the overall lateral width of the agricultural implement 100. In this manner, the elongate sliding member 152 provides 60% of the total mass of the reciprocating portion of the reciprocating knife, and the elongate sliding member 150 provides 40% of the total mass of the reciprocating portion of the reciprocating knife.

The net oscillating lateral mass in the present invention is therefore equal to 60% minus 40%, or 20% of the total mass of the total lateral reciprocating mass when the knives are reciprocated about 180° out of phase. The net lateral reciprocating mass has not been eliminated (as it would be if the reciprocating knife drive assembly 156 was located in the middle of agricultural implement 100, and elongate sliding members 150, 152 were the same length and therefore had the same mass), but it has been substantially reduced. It has further been reduced because only a single gearbox 158 is required to drive both elongate sliding members 150, 152 out of phase with respect to each other. Furthermore, since gearbox 158 is not located at one end or the other (or both) of agricultural implement 100, a significant weight savings can be provided by reducing the weight of the single, short back shaft that drives the gearbox driving the reciprocating knife, instead of the one or two elongate back shafts required to drive one or two gearboxes disposed at one or both of the outer ends of the implement as shown in the prior art.

Having described the preferred embodiment, it will become apparent that various modifications can be made without departing from the scope of the invention as defined in the accompanying claims.

The invention claimed is:

1. A reciprocating knife assembly of an agricultural implement, the implement having a laterally extending mainframe carrying a draper platform including a center endless conveyor arranged for conveying harvested crop rearward, and right and left side endless conveyors respectively located at opposite sides of said center endless conveyor and respectively including first and second endless belts respectively formed into first and second loops having respective inner ends disposed adjacent said center endless conveyor, with the right and left side endless conveyors being respectively arranged for conveying harvested crop laterally onto said center endless conveyor, the reciprocating knife assembly comprising:
a stationary knife support disposed along a leading edge of, and extending substantially a full width of, said implement just forwardly of said draper platform;
a first elongate reciprocating knife disposed along said stationary knife support at said leading edge of the agricultural implement on the left hand side of the implement,
a second elongate reciprocating knife disposed along said stationary knife support at said leading edge of the agricultural implement on the right side of the implement;
said first and second reciprocating knives being disposed end to end and extending colinearly for simultaneous reciprocation in opposite directions,
said first and second reciprocating knives being supported on said stationary knife support for sliding movement on the agricultural implement in a lateral direction generally perpendicular to the direction of travel of the agricultural implement as it travels through an agricultural field harvesting crop; and
a reciprocating knife drive assembly, said reciprocating knife drive assembly comprising,
a first bell crank coupled to the first reciprocating knife to reciprocate said knife in the lateral direction; and
a second bell crank coupled to the second reciprocating knife to reciprocate the second reciprocating knife, wherein each of the first and second bell cranks are disposed within, and adjacent to, the respective inner end of one of said first and second loops, and wherein said first and second reciprocating knives respectively extend leftward and rightward from said first and second bell cranks, including:
at least one conveyor support arm extending beneath said one of the first and second loops and having a front end secured to said stationary knife support and having a rear end pivotally coupled to the mainframe such as to allow said at least one conveyor support arm to pivot up and down about a horizontal and laterally extending axis together with said stationary knife support;
a knife drive frame being positioned within said one of the first and second loops and having a front end fixed to said stationary knife support and a rear end fixed to said at least one conveyor support arm; and
said first and second bell cranks being respectively pivotally mounted to said knife drive frame for rotation about first and second upright axes.

2. The reciprocating knife assembly of claim 1, wherein the reciprocating knife drive assembly further comprises at least one driving member that drives the first and second bell cranks.

3. The reciprocating knife assembly of claim 2, wherein the at least one driving member is elongate, extends fore-and-aft and is disposed at least partially within said one of said first and second loops.

4. The reciprocating knife assembly of claim 1, wherein the reciprocating knife drive assembly further comprises first and second flexible couplings that couple the first and second bell cranks to the first and second reciprocating knifes, respectively.

5. The reciprocating knife assembly of claim 4, wherein the flexible couplings are ball couplings.

6. The reciprocating knife assembly of claim 1, wherein the reciprocating knife drive assembly further comprises a gearbox disposed behind said one of said first and second loops at a location directly behind the first and second bell cranks on the agricultural implement, with the first and second bell cranks being respectively mounted for pivoting about respective first and second upright axes and with the gearbox being coupled for driving said first and second bell cranks in oscillating motion respectively about said first and second upright axes.

7. A reciprocating knife drive assembly of an agricultural implement, the implement having a laterally extending mainframe carrying a draper platform being positioned behind said first and second reciprocating knives and including a center endless conveyor arranged for conveying harvested crop rearward, and right and left side endless conveyors respectively located at opposite sides of said center endless conveyor and respectively including first and second endless belts respectively formed into first and second loops having respective inner ends disposed adjacent said center endless conveyor, with the right and left side endless conveyors being respectively arranged for conveying harvested crop laterally onto said center endless conveyor; and
a reciprocating knife assembly comprising:
a stationary knife support disposed along a leading edge of, and extending substantially a full width of, said implement just forwardly of said draper platform;
a first elongate reciprocating knife disposed along said stationary knife support at said leading edge of the agricultural implement on the left hand side of the implement, a second elongate reciprocating knife disposed along said stationary knife support at said leading edge of the agricultural implement on the right side of the implement; said first and second reciprocating knives being disposed end to end and extending colinearly for simultaneous reciprocation in opposite directions, wherein the first and second reciprocating knives are supported on said stationary knife support for sliding movement along said stationary knife support of the agricultural implement in a lateral direction generally perpendicular to the direction of travel of the agricultural implement as it travels through an agricultural field harvesting crop; wherein the reciprocating knife drive assembly comprises:

a first bell crank coupled to the first reciprocating knife and configured to reciprocate the first reciprocating knife in the lateral direction on the agricultural implement;

a second bell crank coupled to the second reciprocating knife and configured to reciprocate the second reciprocating knife in the lateral direction on the agricultural implement; and a knife drive frame supporting both the first and the second bell cranks for pivoting about respective first and second upright axes, wherein each of the first and second bell cranks are disposed, together with said knife drive frame, within one of said first and second loops respectively of the right and left side conveyors of said draper platform; and further including at least one conveyor support arm extending beneath said one of the first and second loops and having a front end secured to said stationary knife support and having a rear end pivotally coupled to the mainframe such as to allow said at least one conveyor support arm to pivot up and down about a horizontal and laterally extending axis together with said-stationary knife support.

8. The reciprocating knife drive assembly of claim 7, wherein the reciprocating knife drive assembly further comprises at least one elongate fore-and-aft extending driving member that drives both the first bell crank and the second bell crank.

9. The reciprocating knife drive assembly of claim 8, wherein the at least one driving member is disposed at least partially within said one of said first and second loops respectively of the left and right side conveyors of said draper platform.

10. The reciprocating knife drive assembly of claim 7, wherein the reciprocating knife drive assembly further comprises first and second flexible couplings that couple the first and second bell cranks to the first and second reciprocating knifes, respectively.

11. The reciprocating knife drive assembly of claim 10, wherein the flexible couplings are ball couplings.

12. The reciprocating knife drive assembly of claim 7, wherein the reciprocating knife drive assembly further comprises a gearbox fixed to a rear end of said knife drive frame at a location disposed behind said one of said first and second loops and directly behind the first and second bell cranks, the gearbox being coupled to drive both of the bell cranks in an oscillating motion respectively about said first and second upright axes.

13. The reciprocating knife drive assembly of claim 7, wherein said knife drive frame has a front end and a rear end and is pivotally coupled at its rear end to the mainframe to pivot up and down about a horizontal and laterally extending axis and is fixed at its front end to the stationary knife support.

* * * * *